(No Model.)
C. S. GOODNOUGH.
COMBINED ROLLING PIN AND DOUGH CUTTER.
No. 522,465. Patented July 3, 1894.
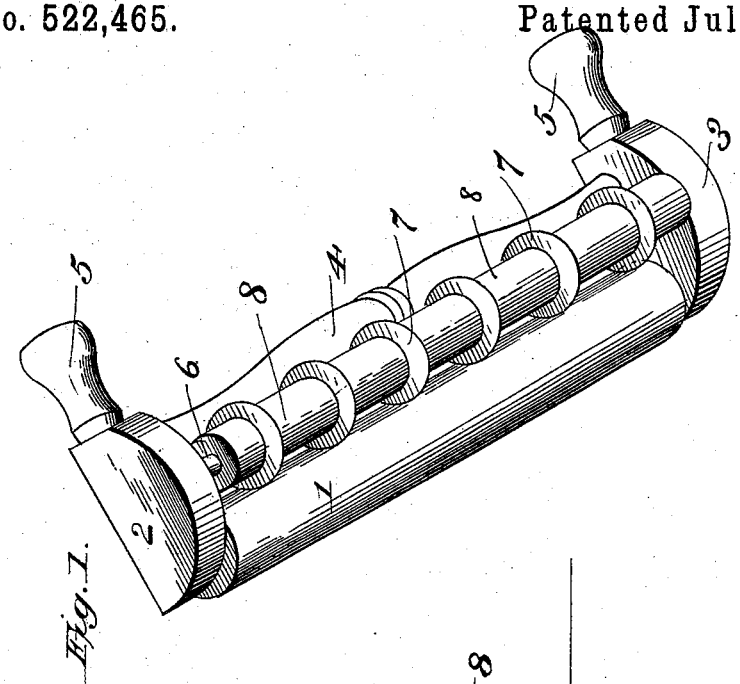
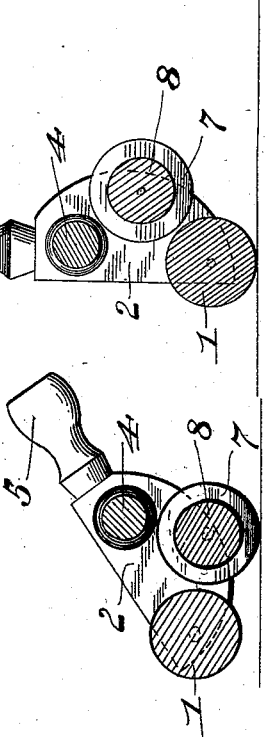
Witnesses:
F. L. Ourand
J. W. L. Coombs
Inventor:
Charles S. Goodnough,
G. Lamm Bagger & Co
Attorneys.

UNITED STATES PATENT OFFICE.

CHARLES S. GOODNOUGH, OF NOUGH, TENNESSEE.

COMBINED ROLLING-PIN AND DOUGH-CUTTER.

SPECIFICATION forming part of Letters Patent No. 522,465, dated July 3, 1894.

Application filed February 2, 1894. Serial No. 498,860. (No model.)

*To all whom it may concern:*

Be it known that I, CHARLES S. GOODNOUGH, a citizen of the United States, and a resident of Nough, in the county of Cocke and State of Tennessee, have invented certain new and useful Improvements in a Combined Rolling-Pin and Dough-Cutter; and I do hereby declare that the following is a full, clear, and exact description of the invention, which will enable others skilled in the art to which it appertains to make and use the same, reference being had to the accompanying drawings, which form a part of this specification.

My invention relates to a combined rolling-pin and dough cutter, and its object is to provide an improved household implement by means of which dough can be rolled into sheets and then cut into strips for making cake, biscuit, &c., in a rapid and efficient manner.

The invention consists essentially in two end blocks connected together by a rod or round and provided with upwardly extending handles, a roller pivoted to said blocks, and a rotatable shaft also pivoted to said blocks, a short distance above and in rear of said roller, and provided with a number of cutting disks, separated from each other by circular spacing blocks, as will be hereinafter fully described and claimed.

In the accompanying drawings: Figure 1 is a perspective view of a combined dough roller and cutter constructed in accordance with my invention. Fig. 2 is a central cross section of the same, showing the implement used as a roller. Fig. 3 is a similar view showing the implement used as a cutter.

In the said drawings, the reference numeral 1 designates a wooden roller, having a short journal at each end, which is shown in dotted lines in Fig. 2, which journals are pivoted in apertures in the end blocks 2, the rear sides 3 of which are curved or semi-circular. These blocks are connected together by a rod or round 4, and are provided with upwardly extending handles 5. Pivoted to the said blocks a short distance above and in rear of the roller, 1 is a rotatable shaft 6 upon which are mounted a number of metal cutting disks 7, separated from each other by circular washers or spacing blocks 8.

The operation of the device will be readily understood. The operator grasps the handles and holds them in a vertical position and moves the roller back and forth over the dough rolling it into a sheet of the proper thickness. By now turning the handles rearwardly, the cutting disks will be thrown into engagement with the sheet and the roller lifted up out of contact therewith. The implement is then pushed over the sheet when the disks will sever it into strips, and by moving the implement transversely across the strips they will be cut into squares.

The device will be found very useful in practice as the dough can be rolled and cut into strips or squares without letting go of the handles, it being only necessary to change the inclination of the handles by a slight movement of the hands, to throw the cutting disks into and out of operative position.

Having thus described my invention, what I claim is—

As an improved article, the combined dough roller and cutter comprising the end blocks, having semi-circular rear sides the round connecting said blocks together, the roller pivoted in said blocks, the handles secured to said blocks at right angles to the roller, the rotatable shaft also pivoted to said blocks and provided with cutting disks and the circular washers or spacing blocks, substantially as described.

In testimony that I claim the foregoing as my own I have hereunto affixed my signature in presence of two witnesses.

CHARLES S. GOODNOUGH.

Witnesses:
S. R. L. JUSTUS,
M. N. STOKELY.